(12) United States Patent
Boulos et al.

(10) Patent No.: US 8,013,269 B2
(45) Date of Patent: Sep. 6, 2011

(54) INDUCTION PLASMA SYNTHESIS OF NANOPOWDERS

(75) Inventors: Maher I. Boulos, Sherbrooke (CA); Jerzy Jurewicz, Sherbrooke (CA); Jiayin Guo, Sherbrooke (CA)

(73) Assignee: Tekna Plasma Systems Inc., Sherbrooke (CA)

( * ) Notice: Subject to any disclaimer, the term of this patent is extended or adjusted under 35 U.S.C. 154(b) by 0 days.

(21) Appl. No.: 11/341,211

(22) Filed: Jan. 27, 2006

(65) Prior Publication Data

US 2007/0029291 A1  Feb. 8, 2007

Related U.S. Application Data

(60) Provisional application No. 60/647,427, filed on Jan. 28, 2005.

(51) Int. Cl.
*B23K 10/00* (2006.01)
(52) U.S. Cl. .......... 219/121.59; 219/121.47; 219/121.51
(58) Field of Classification Search ............. 219/121.47, 219/121.59, 121.36, 121.52, 121.37, 121.38, 219/121.49, 75
See application file for complete search history.

(56) References Cited

U.S. PATENT DOCUMENTS

| 3,668,108 | A | 6/1972 | Houseman ............... 422/186.22 |
| 5,200,595 | A | 4/1993 | Boulos et al. |
| 5,788,738 | A * | 8/1998 | Pirzada et al. ................ 75/331 |
| 6,379,419 | B1 | 4/2002 | Celik et al. |
| 6,398,125 | B1 * | 6/2002 | Liu et al. ........................ 239/13 |
| 6,832,735 | B2 * | 12/2004 | Yadav et al. ................... 241/16 |
| 6,919,527 | B2 | 7/2005 | Boulos et al. |
| 7,125,537 | B2 * | 10/2006 | Liao et al. .................. 423/592.1 |
| 2003/0143153 | A1 | 7/2003 | Boulos et al. |
| 2005/0217421 | A1 | 10/2005 | Boulos et al. |

FOREIGN PATENT DOCUMENTS

| CA | 2445169 | 10/2002 |
| CA | 2481152 | 3/2005 |
| CA | 2512317 | 1/2006 |
| EP | 0291115 | 11/1988 |
| FR | 1474003 | 3/1967 |
| WO | WO 01/46067 | 6/2001 |
| WO | WO 2004/056461 | 7/2004 |

OTHER PUBLICATIONS

Okuyama et al.; "Production of Ultrafine Metal Oxide Aerosol Particles by Thermal Decomposition of Metal Alkoxide Vapors"; *AIChE Journal*: vol. 32, No. 12; pp. 2010-2019; Dec. 1986.

(Continued)

*Primary Examiner* — Mark Paschall
(74) *Attorney, Agent, or Firm* — Fulbright & Jaworski L.L.P.

(57) ABSTRACT

A process and apparatus for synthesizing a nanopowder is presented. In particular, a process for the synthesis of nanopowders of various materials such as metals, alloys, ceramics and composites by induction plasma technology, using organometallic compounds, chlorides, bromides, fluorides, iodides, nitrites, nitrates, oxalates and carbonates as precursors is disclosed. The process comprises feeding a reactant material into a plasma torch in which is generated a plasma flow having a temperature sufficiently high to yield a superheated vapor of the material; transporting said vapor by means of the plasma flow into a quenching zone; injecting a cold quench gas into the plasma flow in the quenching zone to form a renewable gaseous cold front; and forming a nanopowder at the interface between the renewable gaseous cold front and the plasma flow.

13 Claims, 11 Drawing Sheets

OTHER PUBLICATIONS

Girshick et al.; "Homogeneous Nucleation of Particles from the Vapor Phase in Thermal Plasma Synthesis"; *Plasma Chem. And Plasma Processing*, vol. 9; No. 3; pp. 355-369; 1989.

"PCT International Search Report," issued in International Application No. PCT/CA2006/000110, dated Mar. 29, 2006.

Supplementary European Search Report issued in European Application No. 06705084.9, dated Jan. 28, 2008.

* cited by examiner

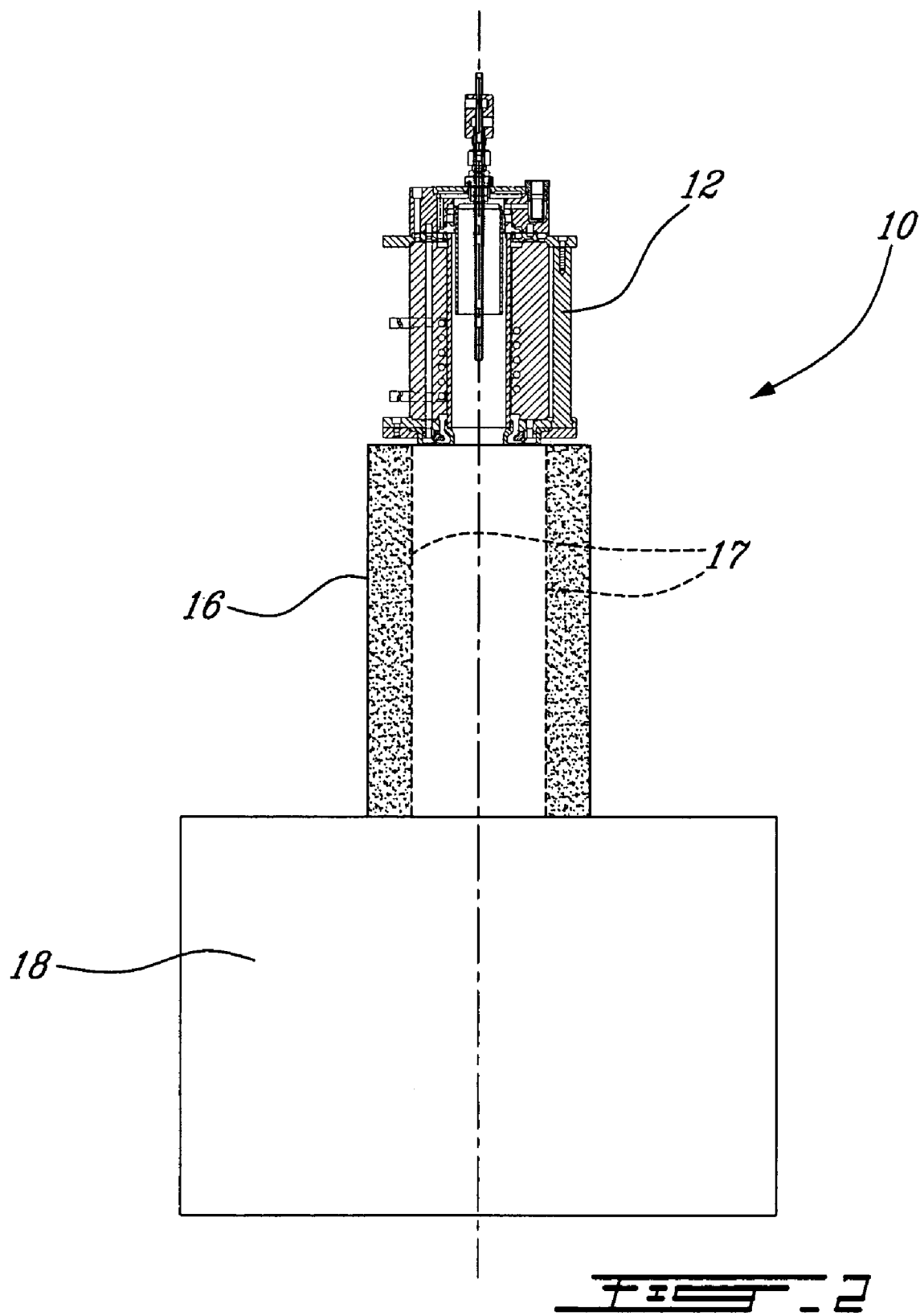

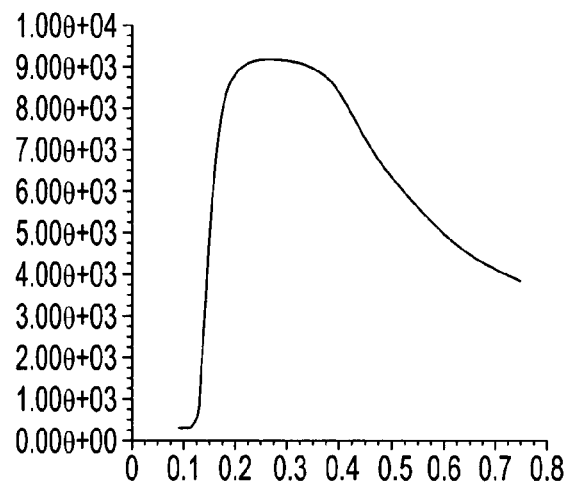
_FIG. 5A_
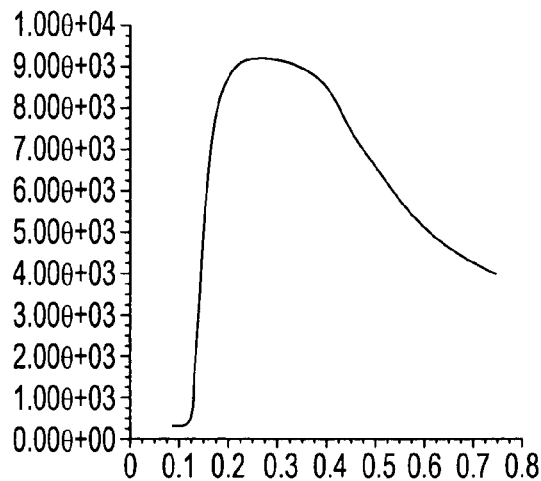
_FIG. 5B_
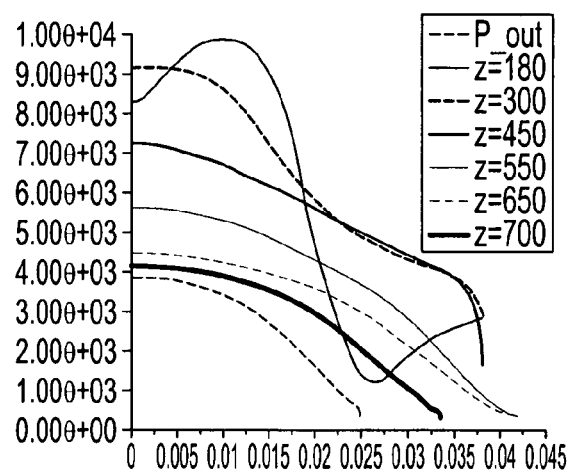
_FIG. 5C_
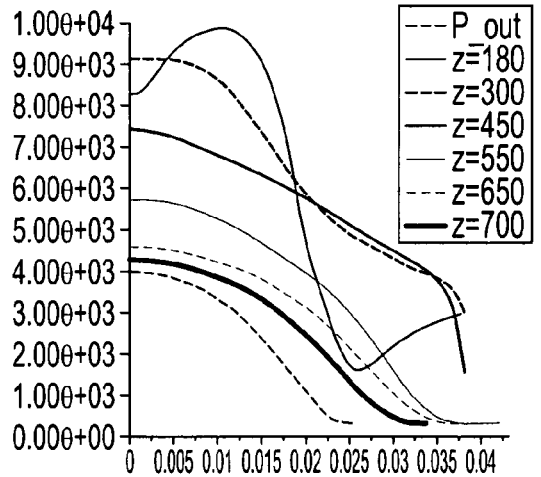
_FIG. 5D_

Gaseous cold front

Gaseous cold front

Gaseous cold front

Gaseous cold front

INDUCTION PLASMA SYNTHESIS OF NANOPOWDERS

CROSS REFERENCE TO RELATED APPLICATIONS

This application claims the benefit of U.S. Provisional Application No. 60/647,427, filed Jan. 28, 2005, which is incorporated by reference.

FIELD OF THE INVENTION

The present invention relates to the plasma synthesis of nanopowders using induction plasma technology. More specifically, but not exclusively, the present invention relates to a process for the synthesis of nanopowders of various materials such as metals, alloys, ceramics and composites by induction plasma technology, using organometallic compounds, chlorides, bromides, fluorides, iodides, nitrites, nitrates, oxalates and carbonates as precursors.

BACKGROUND OF THE INVENTION

The plasma synthesis of nanopowders has attracted increasing attention over the past few years. Numerous processes have been developed for preparing metal, alloy and ceramic-based nanopowders using a wide variety of technologies including plasma discharge, arc discharge, electro-explosion, self propagating high temperature synthesis, combustion synthesis, electric discharge, spray pyrolysis, sol-gel, and mechanical attrition.

High temperature plasma processing routes are based on the concept of heating the reactant precursors (in solid, liquid or vapor/gaseous form), to relatively high temperatures followed by rapid cooling of the reaction products through their mixing with a cold gas stream as in the "high intensity turbulent quench technique" or through their contacting with a cold surface on which the nanoparticles form and deposit. The use of a "highly turbulent gas quench zone" has been previously described by Boulos et al. in U.S. 20050217421 and U.S. 20030143153 as filed on Mar. 25, 2005 and Dec. 6, 2002 respectively. A common objective to all of these processes is the desire to closely control the particle morphology, the particle size distribution, and the agglomeration of the powders obtained. However, a drawback of the use of traditional "cold-surface" condensation techniques is that the nature and the temperature of the condensation surface changes with the build-up of the condensed nanopowder layer.

U.S. Pat. No. 6,379,419 issued to Celik et al. on Apr. 30, 2002 discloses a transferred arc thermal plasma based vapor condensation method for the production of fine and ultra fine powders. The method calls upon a condensation procedure involving an indirect cooling step and a direct cooling step. The indirect cooling step involves a cooling surface whereas the direct cooling step involves the injection of a cooling gas directly onto the vapor. The use of a cooling surface suffers from the drawback of particle build-up on the condensation surface.

It has been shown theoretically that by controlling the initial vapor concentration and temperature, residence time of particle nucleation and growth, and cooling profile, one may have some control on the particle size distribution and crystallinity. This is shown by Okuyama et al. in AIChE Journal, 1986, 32 (12), 2010-2019 and Girshick et al. in Plasma Chem. and Plasma Processing, 1989, 9 (3), 355-369. However, these references remain silent as to an efficient method for producing nanopowders of well defined particle size distribution and morphology.

There remains a need for an improved process for the preparation of nanopowders in which the particle morphology, the particle size distribution, and the agglomeration of particles is readily controlled and that it easily scalable.

The present invention seeks to meet these and other needs.

The present invention refers to a number of documents, the content of which is herein incorporated by reference in their entirety.

SUMMARY OF THE INVENTION

The present invention relates to the plasma synthesis of powders calling upon an induction plasma apparatus comprising an induction plasma torch and a quenching chamber in which a renewable "gaseous cold front" is generated, through the injection of a quench gas, and on which the gaseous reactants/reaction products nucleate. The nucleation generates a nanopowder which is rapidly transported to a collection chamber by the moving cold front. It was surprisingly discovered that by generating a renewable gaseous cold front for nucleating (i.e. condensing) the reactants/reaction products present in the plasma flow, excellent control of the morphology and particle size distribution of the resulting nanopowder could be achieved. Moreover, the use of the renewable gaseous cold front offers a close control over particle agglomeration.

More specifically, as broadly claimed, the present invention relates to a process for synthesizing a nanopowder comprising feeding a reactant material into a plasma torch in which is generated a plasma flow having a temperature sufficiently high to yield a superheated vapour of the material; transporting the vapour by means of the plasma flow into a quenching zone; injecting a cold quench gas into the plasma flow in the quenching zone to form a renewable gaseous cold front; and forming a nanopowder at the interface between the renewable gaseous cold front and the plasma flow.

The present invention also relates to an apparatus for synthesizing nanopowders comprising a plasma torch to generate a plasma flow and to produce a superheated vapour from reactant material supplied to the plasma torch in the plasma flow; and a quenching chamber mounted to the plasma torch downstream therefrom and in fluid communication with said plasma torch to receive the superheated vapour from the plasma torch, the quenching chamber being structured to receive a quench gas and to generate from said quench gas a renewable gaseous cold front to rapidly cool the superheated vapour, yielding nanopowder.

The foregoing and other objects, advantages and features of the present invention will become more apparent upon reading of the following non restrictive description of illustrative embodiments thereof, given by way of example only with reference to the accompanying drawings.

BRIEF DESCRIPTION OF THE DRAWINGS

In the appended drawings:

FIG. 2 is a schematic cross-sectional elevation view of an induction plasma assembly of FIG. 1 without reactor component;

FIG. 5 is graph illustrating temperature profiles along the centerline of the induction plasma torch/reactor sections (5A, 5B) and in the radial direction at different axial locations within the reactor/quench sections of the induction plasma assembly of FIG. 1 (5C, 5D) using an Ar/H$_2$ plasma gas [65 kW; 3 MHz] for a quench gas (Ar) flow rate of 400 slpm (5A, 5C) and a quench gas (Ar) flow rate of 800 slpm, respectively (5B, 5D);

DETAILED DESCRIPTION OF ILLUSTRATIVE EMBODIMENTS

In order to provide a clear and consistent understanding of the terms used in the present specification, a number of definitions are provided below. Moreover, unless defined otherwise, all technical and scientific terms as used herein have the same meaning as commonly understood to one of ordinary skill in the art to which this invention pertains.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The terms "about" or "approximately" are defined as being close to as understood by one of ordinary skill in the art, and in one non-limiting embodiment the terms are defined to be within 10%, preferably within 5%, more preferably within 1%, and most preferably within 0.5%.

The present invention relates to a novel process for the plasma synthesis of nanopowders using induction plasma technology and calling upon a renewable "gaseous cold front", for example a laminar "gaseous cold front" which serves to rapidly quench the reactants/reaction products present in the plasma flow. According to a first alternative, the gaseous cold front may be generated in a quenching chamber comprising a porous metal or ceramic wall through which is uniformly injected a cold quench gas. According to a second alternative, the gaseous cold front may be generated in a quenching chamber comprising a perforated refractory wall.

Figure 1:
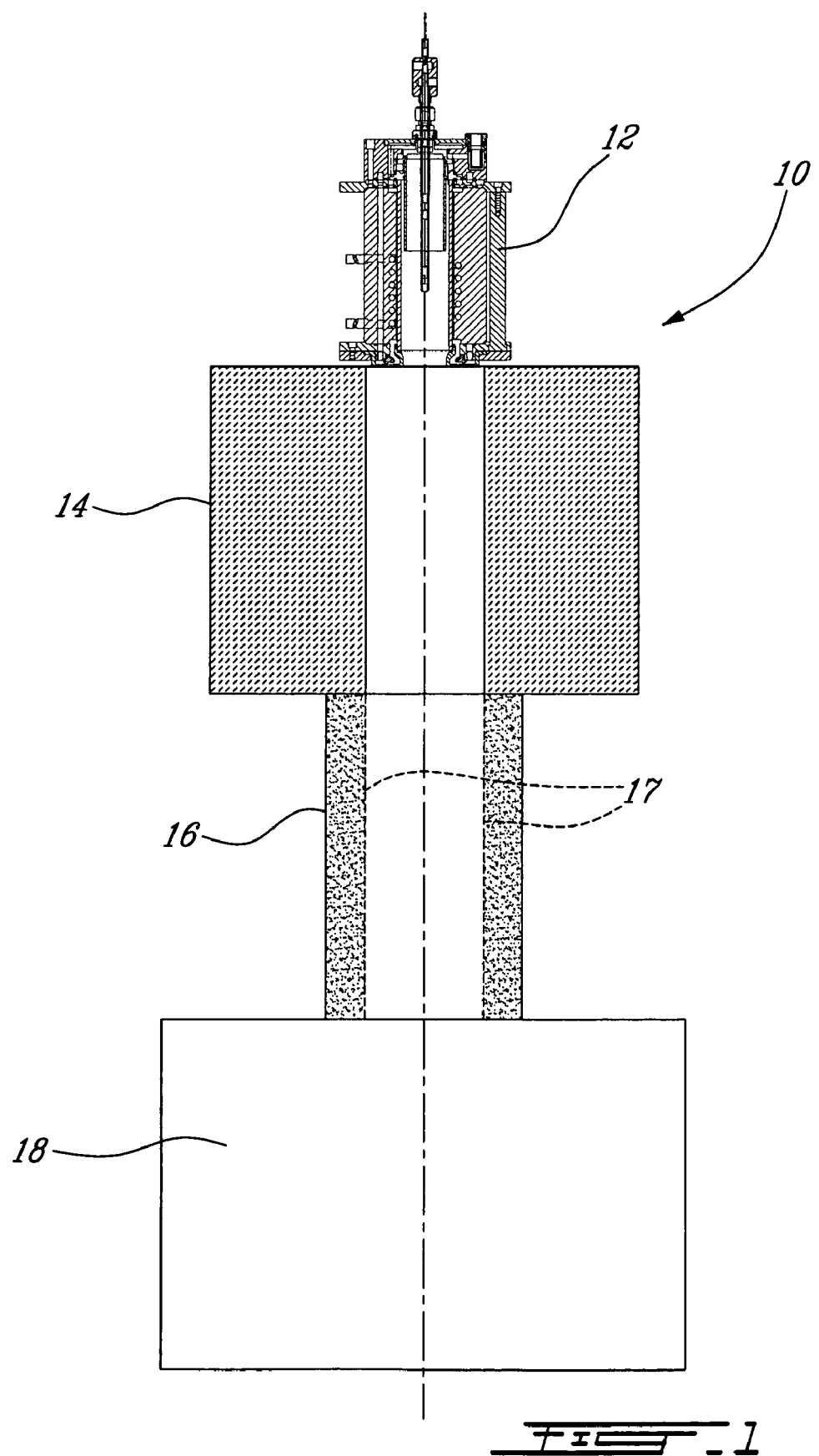
FIG. 1 is a schematic cross-sectional elevation view of an induction plasma assembly in accordance with the present invention.

FIG. 1 shows an illustrative embodiment of the induction plasma assembly, generally identified by the reference 10. The induction plasma assembly 10 of FIG. 1 comprises an upper section consisting of an inductively coupled radio frequency (rf) plasma torch 12 in which the reactants are substantially axially introduced at the feed upper end of the torch 12 and dispersed into the center of the plasma flow using techniques well known to those of ordinary skill in the art. A reactor 14, mounted to a quenching chamber 16, is affixed to the lower end of the plasma torch 12, generally coaxial with the induction plasma assembly 10 between the plasma torch 12 and the quenching chamber 16. The induction plasma assembly 10 further comprises a collection chamber 18 coaxially mounted to the lower end of the quenching chamber 16. Of course, the plasma torch 12, the reactor 14, the quenching chamber 16 and the collection chamber are in fluid communication with each other.

The plasma is generated using any suitable gas that will ionize when subject to a high frequency electromagnetic field, such as a radio frequency field. It is believed to be within the skill of an expert in the art to select a suitable gas. Suitable inductively coupled radio frequency (rf) plasma torches are disclosed in U.S. Pat. No. 6,919,527 issued to Boulos et al. on Jul. 19, 2005. Other suitable plasma torches as contemplated by the process of the present invention include high performance induction plasma torches such as the one disclosed in U.S. Pat. No. 5,200,595 issued to Boulos et al. on Apr. 6, 1993.

The reactant feed may be in the form of fine solid particles, liquid droplets or in the vapor/gaseous phase. In the case of a solid feed, the reactant, upon entering the plasma flow, is melted and vaporized forming a vapor cloud which is superheated to a reaction temperature. In the case of a liquid feed, the heat load on the plasma is substantially limited to that required to heat up the liquid droplets to the vaporization temperature and superheating the vapor to a reaction temperature. In the case of a gaseous feed, the heat load on the plasma is substantially limited to that required to superheat the gaseous feed to the reaction temperature. The plasma flow axially delivers the vapor cloud to the reactor 14 in which it may be further mixed with other components present in the vapor/gaseous phase. In an embodiment of the present invention, a further component may be an oxidizing agent such as oxygen, a carburizing agent such as methane or acetylene, or a nitrating agent such as ammonia. Of course, the other components may be concomitantly introduced into the plasma torch 12 with the reactant feed, or introduced in the reactor section 14, or in the quench section 16, using techniques well known to those of ordinary skill in the art.

The plasma flow carries the reactants/reaction products emerging from the plasma torch 12 into a reactor 14 in fluid communication therewith. In an embodiment of the present invention, the reactor 14 may be a high temperature graphite/refractory lined reactor. It is believed to be within the skill of an expert in the art to select other suitable reactors and reactor configurations. In the event that the feed was concomitantly introduced into the plasma torch 12 mixed with other components, the reactor 14 allows for any reaction to be completed. Alternatively, the superheated feed exits the plasma torch 12 at a reaction temperature and is carried by the plasma flow into the reactor 14 where it is mixed and reacted with other components.

Upon exiting the reactor 14, the reactants/reaction products are carried into a quenching chamber 16. In an embodiment of the present invention, the quenching chamber 16 may comprise a porous metal or ceramic wall section 17 through which a cold quench gas and/or reactants are injected. Alternatively, the quenching chamber 16 may comprise a perforated or slotted refractory wall section through which the cold quench gas and/or reactants may be injected. It is believed to be within the skill of an expert in the art to determine and select other suitable quenching chamber configurations. The injection of the cold quench gas, mixed with or without other reactants, generates a mobile and continuously renewable laminar "gaseous cold front" on which the gaseous reactants/reaction products condense. Such a condensation results in a nucleation of reactants/reaction products generating a nanopowder. The "gaseous cold front" is renewable since it is in movement; the movement being imparted by the continuous injection of cold quench gas and by the movement of the plasma flow. The physical separation of the reaction section (i.e. the plasma torch 12 and/or the reactor 14) and the quench section (quenching chamber 16) provides for a better means of controlling the location of the condensation front over which nanopowder formation occurs. The gaseous cold front is further illustrated in FIGS. 3, 4, 6 and 7. In an embodiment of the present invention, argon was used as the quench gas. It is believed to be within the skill of an expert in the art to determine and select other suitable quench gases.

The quench rate to which the gaseous reactants/reaction products are exposed will depend on the temperature of the quench gas and its flow rate. The flow rate of the quench gas also affects the position of the cold front within the quenching chamber 16 and the manner in which the cold front interacts with the hot flow of plasma gases emerging from the reactor 14 and comprising the reactants/reaction products. The nanopowder is carried away on the mobile cold front into the collection chamber 18. Of course, the plasma gases will also be at significantly lower temperatures, due to their interaction with the cold front, upon reaching the collection chamber 18.

Figure 3A:
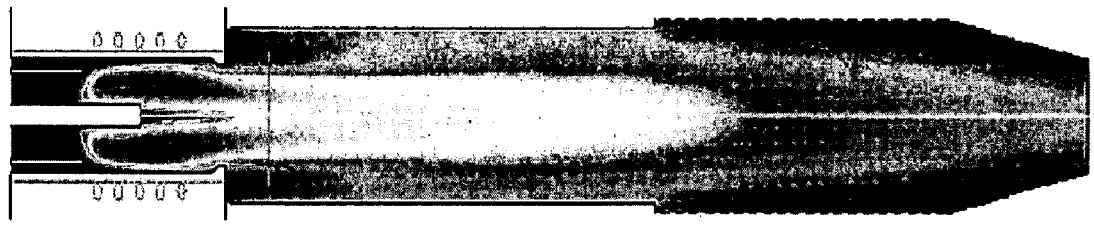
FIG. 3 is an illustration of the temperature isocontours in the induction plasma assembly of FIG. 1 using an Ar/$H_2$ plasma gas [65 kW; 3 MHz] for (3A) a quench gas (Ar) flow rate of 400 slpm and (3B) a quench gas (Ar) flow rate of 800 slpm, respectively.
Figure 3B:
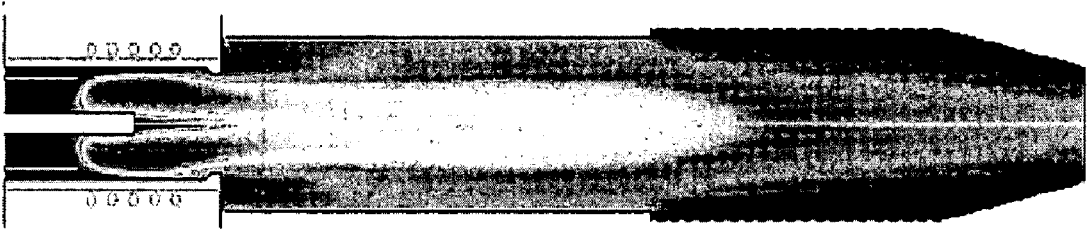
Figure 4A:
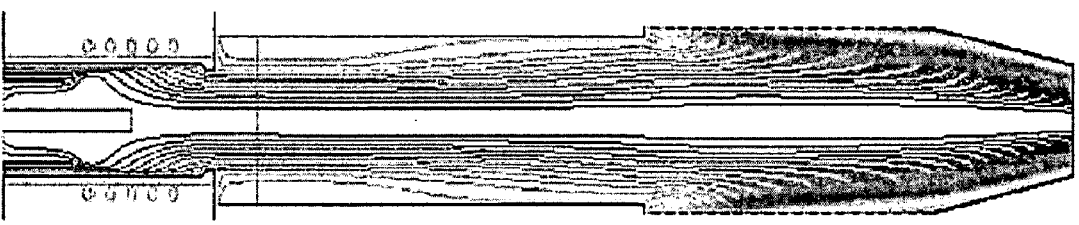
FIG. 4 is an illustration of the stream lines in the induction plasma assembly of FIG. 1 using an Ar/H$_2$ plasma gas [65 kW; 3 MHz] for (4A) a quench gas (Ar) flow rate of 400 slpm and (4B) a quench gas (Ar) flow rate of 800 slpm, respectively.
Figure 4B:
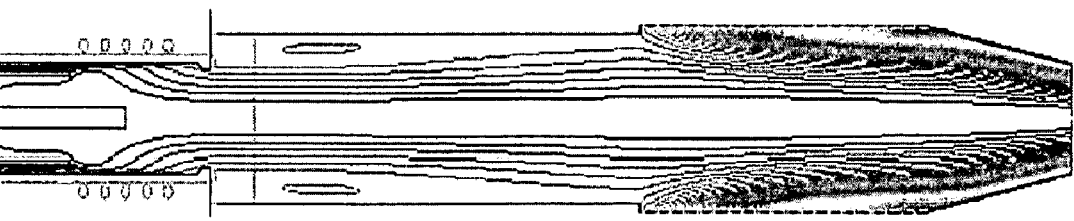

The process according to the present invention involves the concept of a renewable "gaseous cold front" as an effective means of controlling the uniformity and particle size distribution of the produced nanopowder. Furthermore, the possibility for condensed nanoparticle agglomeration is significantly reduced since the nanopowder is rapidly evacuated, substantially upon its formation, from the quenching chamber 16 to the collection chamber 18 by the gaseous cold front at present comprised of plasma gases and the quench gas. Moreover, by using a high volume quench gas flow rate, it is possible to maintain the generated nanopowder in dilute suspension while it is being evacuated from the quenching chamber 16 into the collection chamber 18. Additionally, by maintaining a dilute suspension, both the deposition of the nanopowder on the walls of the quenching chamber 16 and nanoparticle agglomeration through inter-particle collision are substantially eliminated. Typical temperature and flow fields as observed in the plasma torch 12, the reactor 14 and the quenching chamber 16 respectively, are illustrated in FIGS. 3 and 4 for quench gas flow rates of 400 and 800 standard liters per minute (slpm). These figures clearly demonstrate the constricting effect of the "gaseous cold front" on the hot plasma gas stream. The more intense the gaseous cold front, the greater the constricting effect. Moreover, as may be observed from FIGS. 3 and 6, an increase in the quench gas flow rate results in a significant increase in the thickness of the cold boundary layer and a gradual displacement of the cold front toward the center of the plasma flow. Furthermore, the increase in the thickness of the cold boundary layer is accompanied by the development of steep temperature gradients at the interface of the cold front and the plasma flow, where the nucleation of the reactants/reaction products takes place. While not shown in these figures, changing the length of the reactor, combined with a close control of the quench gas flow rate offers tangible means of controlling the position of the cold front in the reactor assembly and accordingly the exact moment at which the reactants/reaction products are subjected to rapid cooling. In the case wherein the reactor 14 is absent, the reactants/reaction products are substantially immediately exposed to the cold front following their vaporization in the plasma torch 12. In the illustrative embodiment as shown in FIGS. 3 and 4, the plasma gas was composed of an argon/hydrogen mixture (80% vol/20% vol) whereas the gaseous cold front was created using argon which was injected through the porous metal wall of the quenching chamber 16.

Figure 6A:
FIG. 6 is an illustration of the "gaseous cold front" showing the quench gas concentration isocontours in the quench section of the induction plasma assembly of FIG. 1 using an Ar/H$_2$ plasma gas [65 kW; 3 MHz] for (6A) a quench gas (Ar) flow rate of 400 slpm and (6B) a quench gas (Ar) flow rate of 800 slpm, respectively.
Figure 6B:
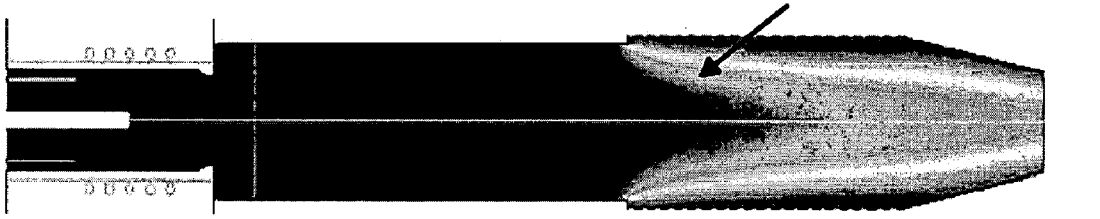
Figure 7A:
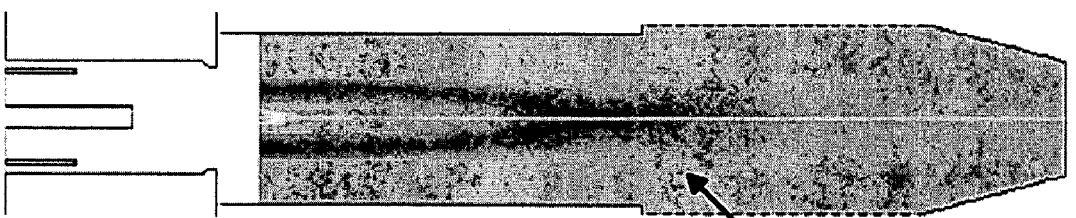
FIG. 7 is an illustration of the reaction product cooling rate isocontours (darker areas are representative of cooling rates in the range of $10^5$ to $10^6$ K/S) in the quench section of the induction plasma assembly of FIG. 1 using an Ar/H$_2$ plasma gas [65 kW; 3 MHz] for (7A) a quench gas (Ar) flow rate of 400 slpm and (7B) a quench gas (Ar) flow rate of 800 slpm, respectively.
Figure 7B:
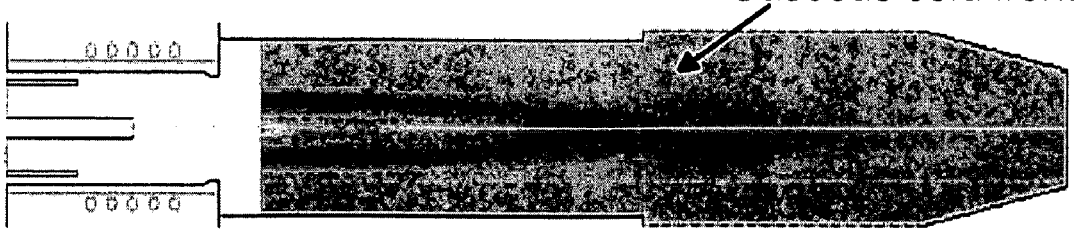
Figure 8:
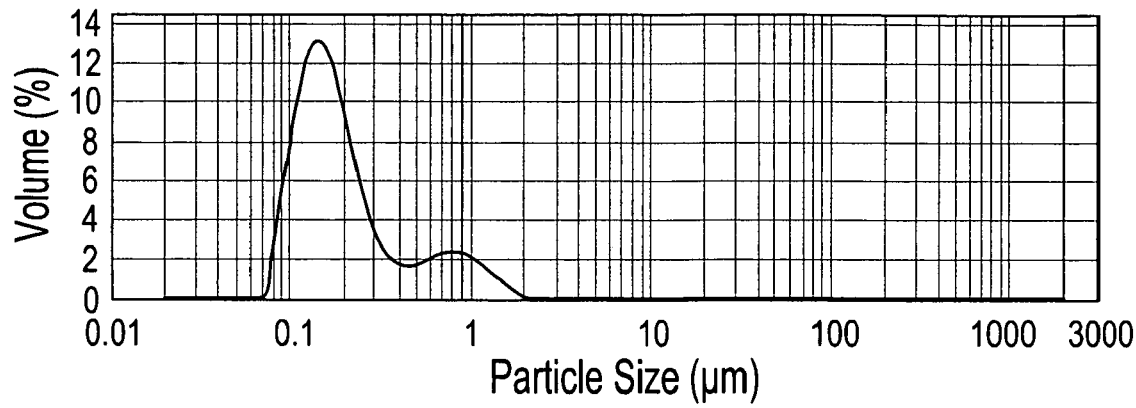
FIG. 8 is a graph showing the particle size distribution for an aluminum nanopowder as obtained using the induction plasma assembly of FIG. 1 using an Ar/H$_2$ plasma gas [65 kW; 3 MHz]
Figure 9:
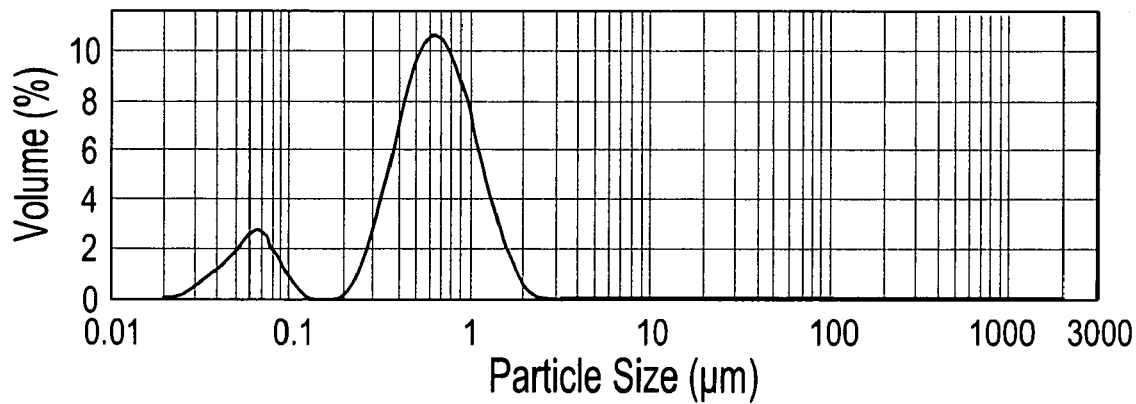
FIG. 9 is a graph showing the particle size distribution for a nickel nanopowder as obtained using the induction plasma assembly of FIG. 1 using an Ar/H$_2$ plasma gas [65 kW; 3 MHz]
Figure 10:
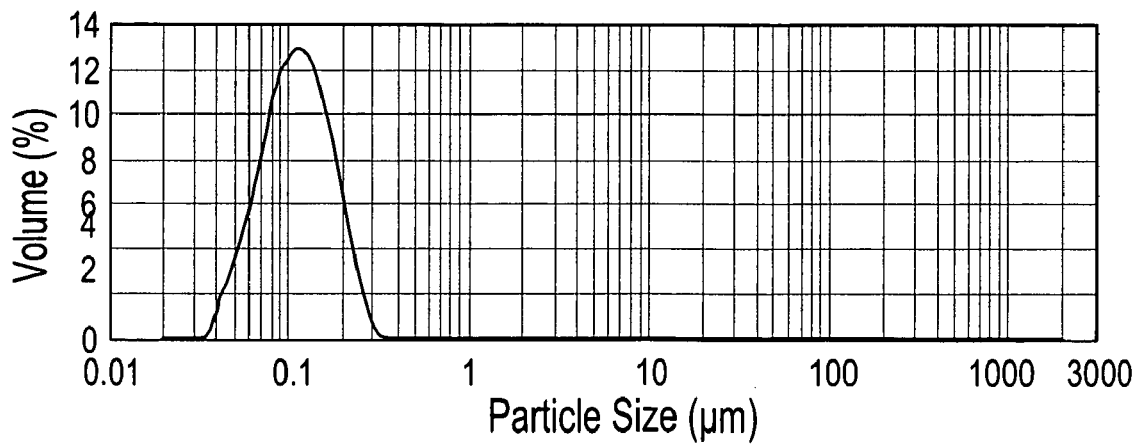
FIG. 10 is a graph showing the particle size distribution for a tungsten nanopowder as obtained using the induction plasma assembly of FIG. 1 using an Ar/H$_2$ plasma gas [65 kW; 3 MHz]
Figure 11:
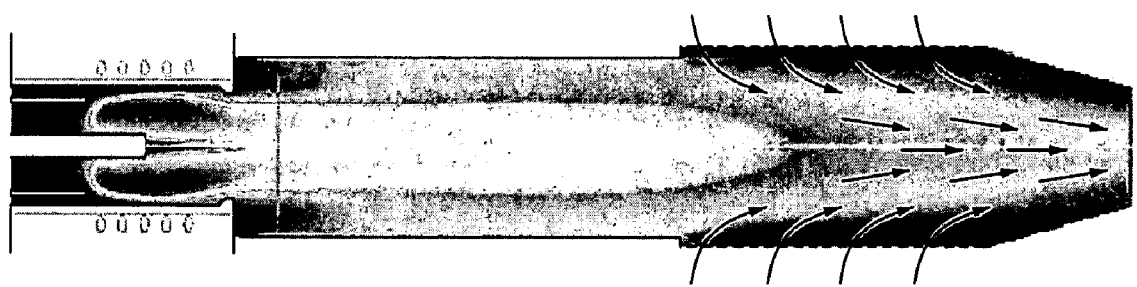
FIG. 11 is an illustration of the quench gas flow within the quench section of the induction plasma assembly of FIG. 1.
Figure 12A:
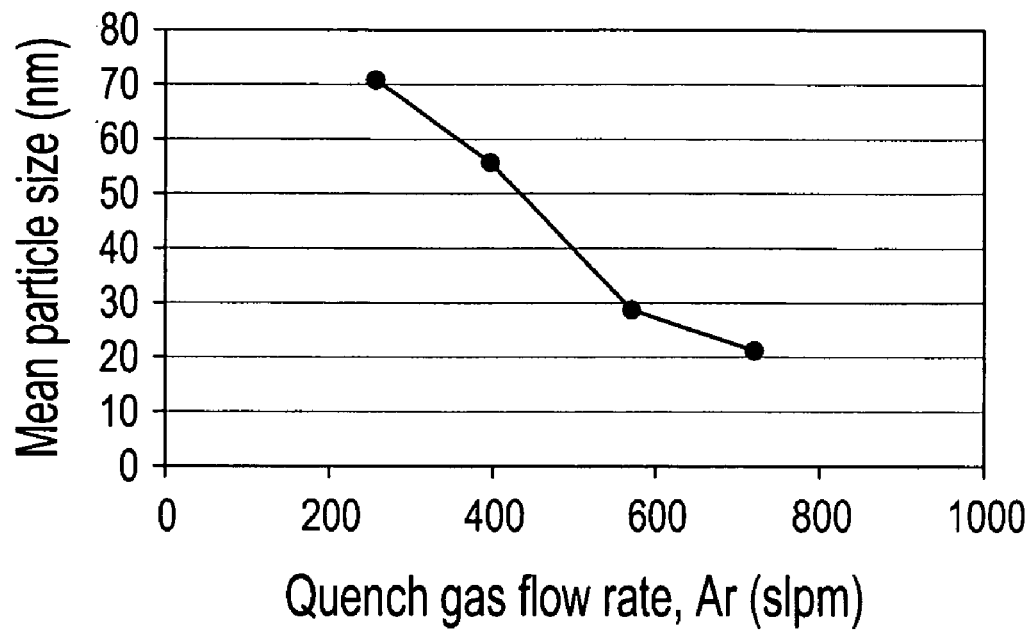
FIG. 12 is a graph showing the mean particle size (12A) and the specific surface area (12B) of a nanometric nickel powder as produced by a process according to the present invention as a function of the quench gas (Ar) flow rate.
Figure 12B:
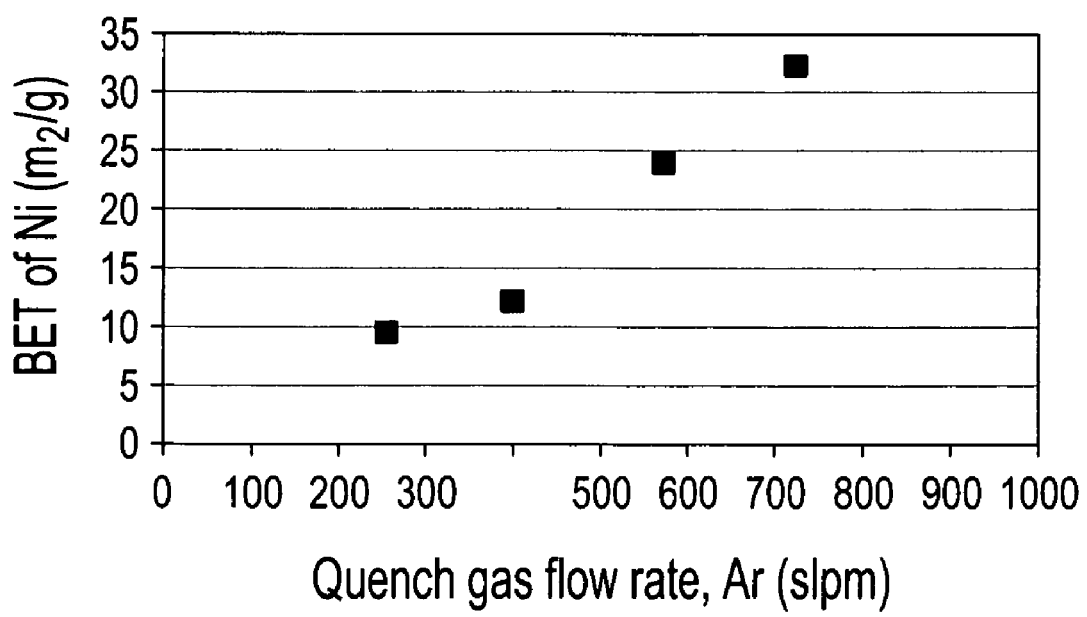
Figure 13A:
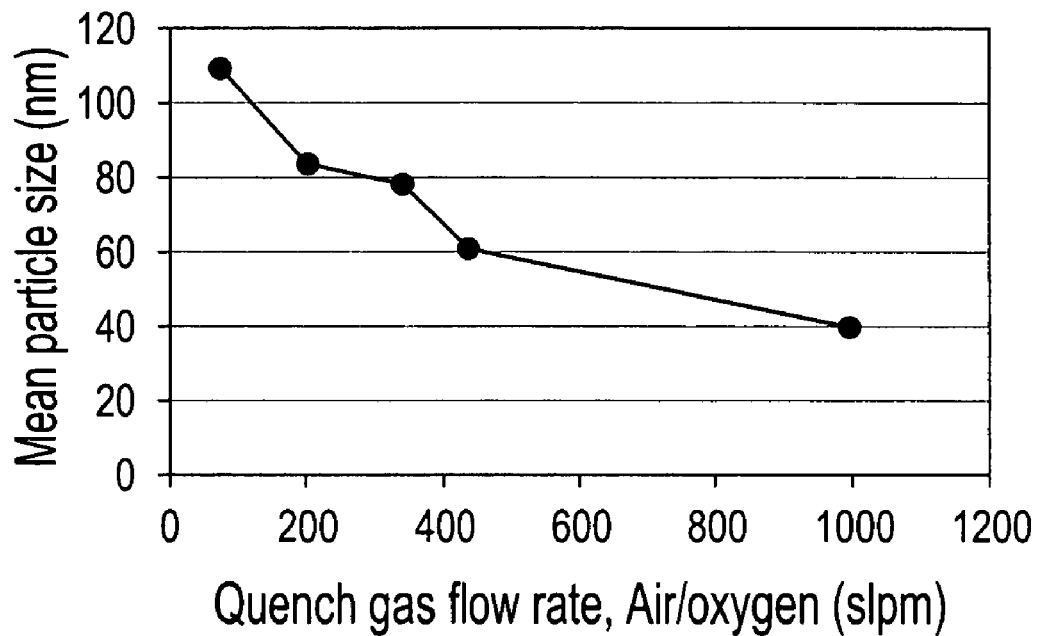
FIG. 13 is a graph showing the mean particle size (13A) and the specific surface area (13B) of a nanometric cupric oxide (CuO) powder as produced by the process of the present invention (starting with micrometric-sized copper powder) as a function of the quench gas (Ar/O$_2$) flow rate.
Figure 13B:
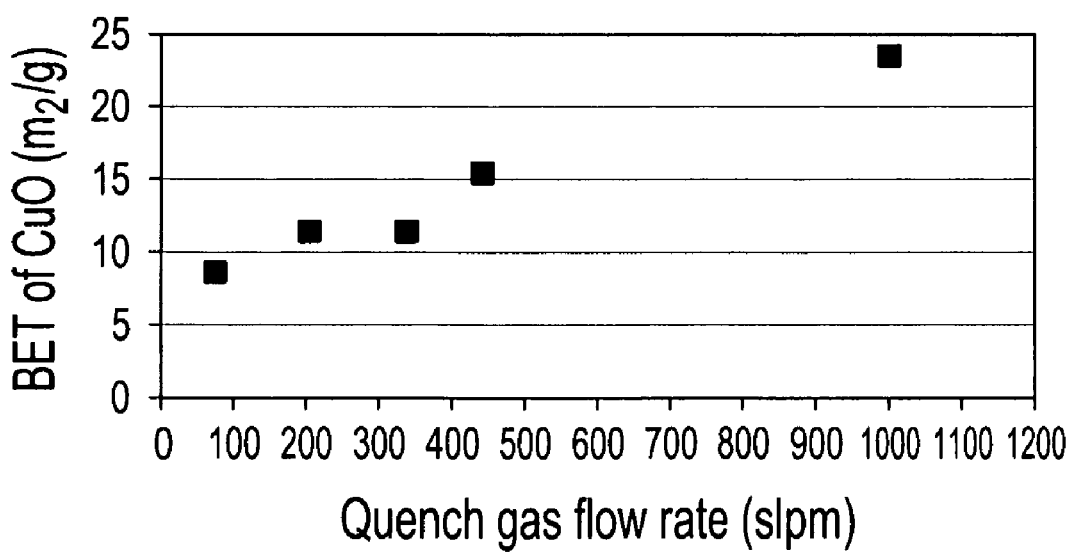
Figure 14A:
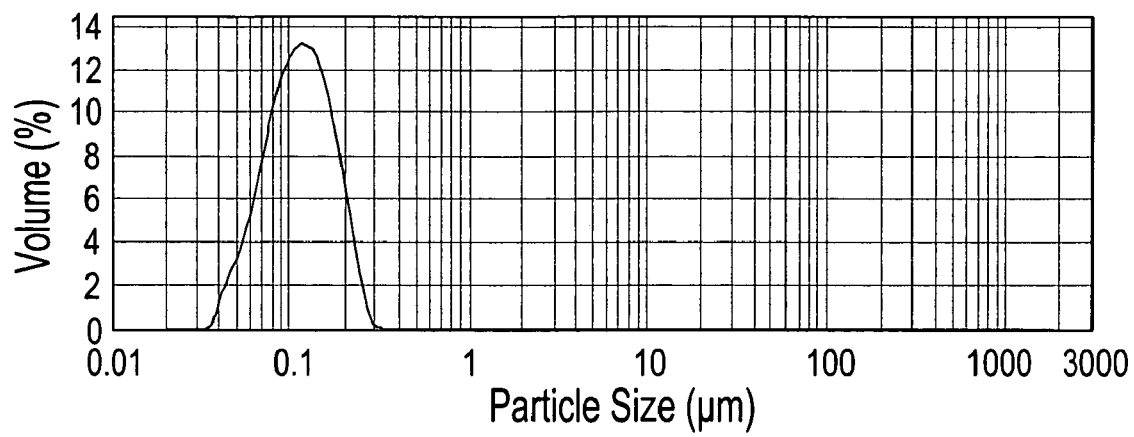
FIG. 14 is a graph showing the particle size distribution of a cupric oxide nanopowder (BET=23.08 m$^2$/g (14A) and 22.11 m$^2$/g (14B) respectively) as produced by the process of the present invention (starting with micrometric-sized copper powder)
Figure 14B:
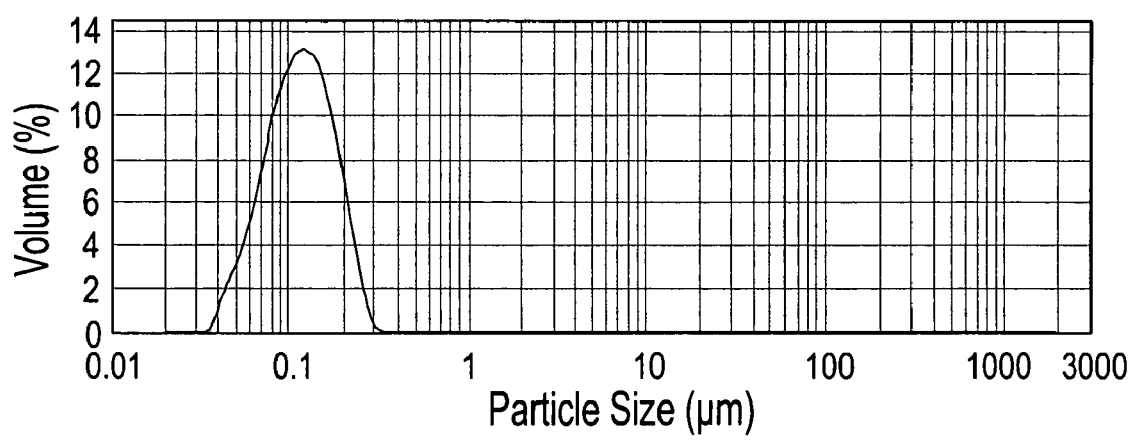

A typical "gaseous cold front" and the associated quench gas concentration isocontours as observed in the quenching chamber 16 is illustrated in FIG. 6. Furthermore, typical isocontours of reaction product cooling rate, as produced when the hot plasma gases comprising the reaction products collide with the gaseous cold front, are illustrated in FIG. 7. These figures illustrate a substantially uniform, renewable and mobile cooling gas front across which the reaction products are exposed to high cooling rates in the order of about $10^5$ to about $10^6$ K/s. Such a gaseous cold front allows for particle nucleation to occur at the interface with the hot plasma gases and the formation of a nanopowder having a substantially uniform particle size distribution, representative examples of which are illustrated in FIGS. 8-10.

The process of the present invention offers the additional advantages of being compact, scalable and simple to operate. Moreover, the reactor assembly 10 can be readily modified depending on the needs and type of nanopowder to be produced. Vapor, liquid or solid precursors may be used in the process according to the present invention with the produced nanopowder being either of identical or different chemical composition as that of the precursor. In the case wherein the produced nanopowder is of identical chemical composition, the process is limited to the vaporization and condensation of the feed generating nanoparticles thereof. In the case wherein the produced nanopowder is of different chemical composition, the feed was reacted with a second reactant which can be either injected in the plasma torch 12 or introduced in the reactor 14. Alternatively, the quench gas may react with the vaporized feed in which case it serves a dual function. As illustrated in FIG. 2, the reactor 14 can be removed such that the plasma feed comprising the gaseous reactants or alternatively the gaseous reactants/reaction products, are brought directly into the quenching chamber 16. If the feed material is to be chemically modified, a non-limiting example of which is oxidation, the presence of the reactor might be required. It is believed to be within the skill of an expert to select an appropriate reactor assembly depending on the type of nanopowder to be produced.

EXPERIMENTAL

A number of examples are provided hereinbelow, illustrating the efficiency of a renewable laminar gaseous cold front in the synthesis of a number of metallic and ceramic nanopowders using induction plasma technology.

Synthesis of Nanopowders Using Solid Precursors.

An argon/hydrogen induction plasma flow is generated using a 50 mm internal diameter induction plasma torch with an oscillator frequency of 3 MHz, a plasma plate power of 65 kW, and a reactor pressure of approximately 500 Torr. Different metals, in the form of a micron-sized metallic powder, were axially injected into the center of the plasma discharge and vaporized. As the hot plasma gases comprising the vaporized metal emerge from the reactor, they are intercepted by the gaseous cold front which is created by means of injecting argon through the porous walls of the quenching chamber. The interaction of the hot plasma gases with the gaseous cold front gives rise to a nucleation phenomenon at the interface hot plasma gases/gaseous cold front, leading to the formation of a nanopowder having a well defined particle size distribution. The continuously moving gaseous cold front, now also made-up of cooled plasma gases, rapidly evacuates the nanopowder to a collection chamber where it can be collected on standard sintered metal or cloth filter elements. The experimental results as obtained for aluminum, nickel and tungsten powders are summarized hereinbelow in Table 1. Data regarding plasma plate power, precursor feed rates, quench gas rates, and physical characteristics of the collected nanopowder such as their Specific Surface Area (as measured using the BET method) and particle mean diameter are also provided. The Specific Surface Area is expressed in terms of $m^2/g$ of collected powder. The mean particle diameter of the collected powder can be calculated assuming a spherical particle shape having an equivalent surface area to volume ratio. The particle size distributions, obtained by light scattering analysis using a Malvern Mastersizer™ instrument are illustrated in FIGS. 8-10 respectively.

TABLE 1

Examples of metallic nanopowders as obtained using the process of the present invention.

| Metal | Sample Number | Plate Power kW | Feed Rate g/min | Quench Rate slpm | BET $m^2/g$ | Mean Diam. nm |
|---|---|---|---|---|---|---|
| Al | 04-1113-02 | 60 | 20 | 1300 | 61.66 | 36 |
| Ni | 04-1116-03 | 60 | 19 | 1300 | 15.07 | 44.7 |
| W | 04-1110-04 | 70 | 20 | 1100 | 11.83 | 26.2 |

Synthesis of Nanopowders Using Liquid Precursors.

Figure 15A:
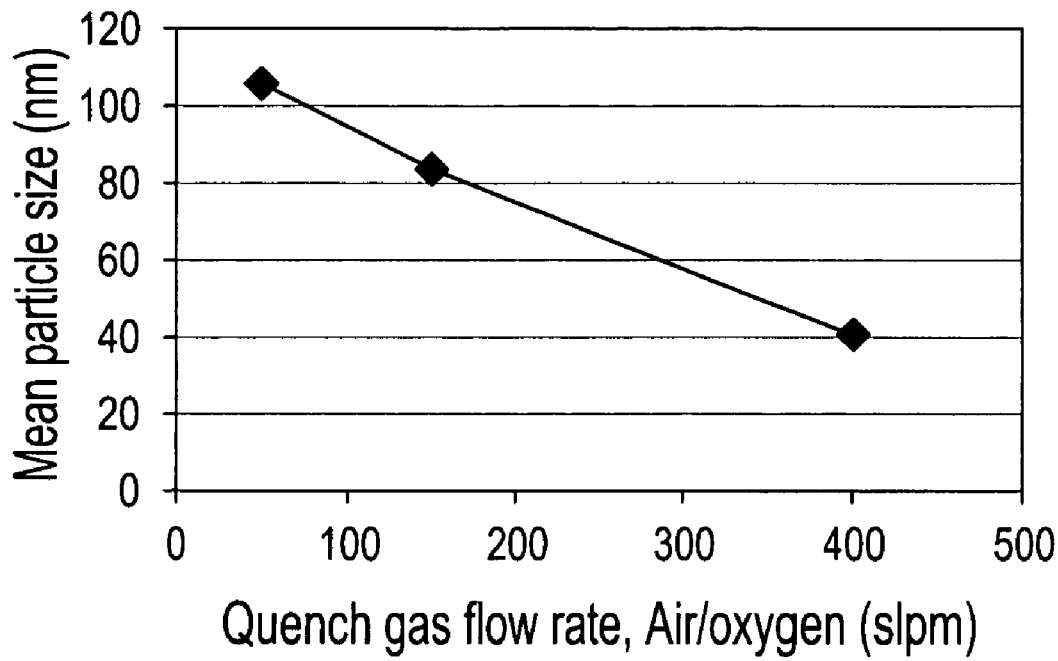
FIG. 15: is a graph showing the mean particle size (15A) and the specific surface area (15B) of a nanometric germanium dioxide (GeO$_2$) powder as produced by the process of the present invention (starting with liquid GeCl$_4$) as a function of the quench gas (Ar/O$_2$) flow rate.
Figure 15B:
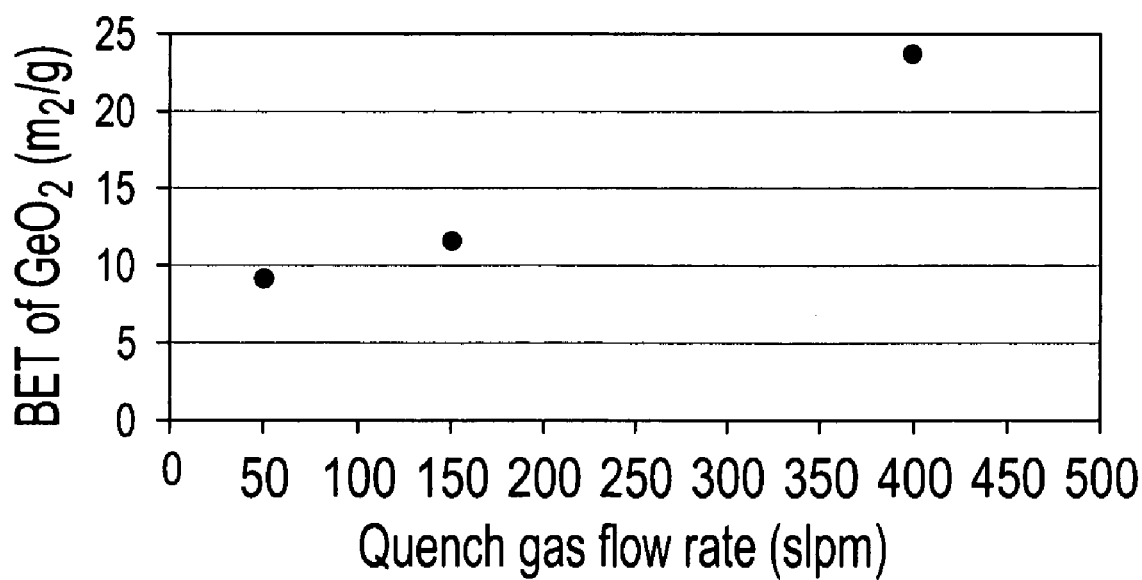

As illustrated in FIG. 15 and in Table 2 below, the process according to the present invention lends itself to the synthesis of nanopowders using liquid feeds. Liquid germanium tetrachloride (GeCl$_4$, b.p.=83° C.) was sent by a Masterflex™ pump into an oxygen plasma. The liquid was vaporized and oxidized. The produced germanium dioxide (GeO$_2$) vapor was condensed to nanometric powders by injection of cold quench gas flow generating the "gaseous cold front". The process as occurring in FIG. 15 can be illustrated by the following reaction:

$$GeCl_4(l)+O_2(g) \rightarrow GeO_2(s)+2Cl_2(g)$$

TABLE 2

Examples of process parameters* for producing GeO$_2$ (g) starting with GeCl$_4$ (l).

| GeCl$_4$ feed rate (g/min) | Quench gas flow rate, O$_2$ (lpm) | Feed time (min) |
|---|---|---|
| 67.2 | 50 | 15 |
| 21.9 | 150 | 15 |
| 33.2 | 400 | 15 |
| 30.0 | Variable | 15 |

*Plasma power: 65 kW; Plasma sheath: 18 Ar + 82 O$_2$ (slpm); Plasma central: 30Ar (slpm); Injection probe: SA953; Atomization gas: 8O$_2$ (slpm); Reactor pressure: 80 kPa.

Synthesis of Nanopowders Using Gaseous Precursors.

The process of the present invention also lends itself to the synthesis of nanopowders using gaseous feeds as illustrated by the following reaction:

$$4BCl_3(g)+CH_4(g)+4H_2 \rightarrow B_4C(s)+12HCl(g)$$

It is to be understood that the invention is not limited in its application to the details of construction and parts as described hereinabove. The invention is capable of other embodiments and of being practiced in various ways. It is also understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A process for synthesizing a nanopowder comprising:
   a) feeding a reactant material into a plasma torch in which is generated a plasma gas stream having a temperature sufficiently high to yield a superheated vapour of said material;
   b) transporting said superheated vapour by means of said plasma gas stream into a quenching zone, wherein the quenching zone is a quenching chamber comprising a porous wall;
   c) injecting a cold quench gas into the plasma gas stream through a plurality of openings in the porous wall at a flow rate sufficient to form a laminar, renewable gaseous cold front and gradually displace the cold front toward the center of the plasma gas stream, thereby constricting the plasma gas stream; and
   d) forming a nanopowder from the superheated vapour at the interface between the renewable gaseous cold front and the plasma gas stream.

2. The process of claim 1 further comprising collecting the nanopowder in a collection zone.

3. The process of claim 1, wherein the constricting effect is proportional to the quench gas flow rate.

4. The process of claim 1, wherein the plurality of openings define a slotted wall section.

5. The process of claim 1, wherein the plurality of openings define a perforated wall section.

6. The process of claim 1, wherein the reactant material is selected from the group consisting of solid, liquid and gaseous feeds.

7. The process of claim 1, wherein said superheated vapour is at a reaction temperature capable of reacting with said plasma gas stream and/or said quench gas.

8. The process of claim 6, wherein the reactant material is selected from the group consisting of metals, alloys, organometallic compounds, chlorides, bromides, fluorides, iodides, nitrites, nitrates, oxalates, carbonates, oxides and composites.

9. The process of claim 1, further comprising:
   a) feeding a second reactant in the plasma gas stream; and
   b) reacting the second reactant with the reactant material to produce a nanopowder of chemical composition different from the reactant material.

10. The process of claim 9, comprising injecting the second reactant into the plasma torch.

11. The process of claim 9, comprising injecting the second reactant into a reactor between the plasma torch and the quenching zone.

12. The process of claim 9, wherein the second reactant is the quench gas.

13. The process of claim 1, wherein the renewable gaseous cold front exposes the reactant material to a cooling rate from about $10^5$ to $10^6$ K/s.

* * * * *